US012544896B2

(12) United States Patent
Chigira et al.

(10) Patent No.: US 12,544,896 B2
(45) Date of Patent: Feb. 10, 2026

(54) STAPLE REMOVING DEVICE

(71) Applicant: MAX CO., LTD., Tokyo (JP)

(72) Inventors: Yoshio Chigira, Tokyo (JP); Katsuya Hakozaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 386 days.

(21) Appl. No.: 18/239,431

(22) Filed: Aug. 29, 2023

(65) Prior Publication Data

US 2024/0066674 A1 Feb. 29, 2024

(30) Foreign Application Priority Data

Aug. 31, 2022 (JP) ................................ 2022-137733

(51) Int. Cl.
*B25C 11/00* (2006.01)

(52) U.S. Cl.
CPC .................................... *B25C 11/00* (2013.01)

(58) Field of Classification Search
CPC .............. B25C 11/00; B65H 1/08; B65H 1/14
See application file for complete search history.

(56) References Cited

U.S. PATENT DOCUMENTS 4,637,538 A * 1/1987 Wagner .................. B25C 11/00
227/63
6,634,633 B1 * 10/2003 Maruchi ................ G03G 15/60
270/58.33
2019/0270189 A1 * 9/2019 Matsuda ................. B25C 11/00
2022/0176533 A1 6/2022 Yagi et al.

FOREIGN PATENT DOCUMENTS

EP 3804909 A1 4/2021
EP 4008484 A1 6/2022
JP 2020078844 A * 5/2020
JP 2021-024017 A 2/2021

OTHER PUBLICATIONS

Feb. 12, 2024—(EP) Extended Search Report—App 23194695.5.

* cited by examiner

*Primary Examiner* — Tyrone V Hall, Jr.
(74) *Attorney, Agent, or Firm* — Banner & Witcoff, Ltd.

(57) ABSTRACT

A staple removing device configured to remove a staple from a sheet bundle bound by the staple, the staple removing device includes a support part comprising a placement surface capable of placing the sheet bundle thereon, an insertion part configured to be insertable between the sheet bundle and the staple in a state in which the sheet bundle is supported on the support part, and configured to remove the staple from the sheet bundle by the insertion, and a controller configured to control an operation of the insertion part. The controller is configured to reciprocally move the insertion part multiple times between the sheet bundle and the staple in a process of removing the staple from the sheet bundle.

11 Claims, 10 Drawing Sheets

STAPLE REMOVING DEVICE

CROSS-REFERENCE TO RELATED APPLICATIONS

The present application claims priority from Japanese Patent Application No. 2022-137733 filed on Aug. 31, 2022, the entire content of which is incorporated herein by reference.

TECHNICAL FIELD

The present disclosure relates to a staple removing device.

BACKGROUND ART

In the related art, disclosed is a technology related to a staple removing device that automatically removes a staple from a sheet bundle bound by the staple (for example, refer to JP2021-24017A). The staple removing device is a device that removes a staple from a sheet bundle by inserting a removing part (plate-shaped member) having a wedge-shaped tip end portion between the sheet bundle and the staple.

SUMMARY

However, in the staple removing device of the related art, for example, when a sheet bundle is thick, resistance at the time of pulling out a staple from the sheet bundle increases, so the staple can only be pulled out halfway from the sheet bundle with a single advancing (inserting) operation of the removing part. This problem may also occur when the rigidity of each sheet is high or depending on a type of the staple (wire diameter, material, and the like).

Therefore, the present disclosure is to provide a staple removing device capable of removing a staple from a sheet bundle even when the sheet bundle is thick, for example.

According to an aspect of the present invention, there is provided a staple removing device configured to remove a staple from a sheet bundle bound by the staple, the staple removing device including:

a support part comprising a placement surface capable of placing the sheet bundle thereon;

an insertion part configured to be insertable between the sheet bundle and the staple in a state in which the sheet bundle is supported on the support part, and configured to remove the staple from the sheet bundle by the insertion; and a controller configured to control an operation of the insertion part, wherein the controller is configured to reciprocally move the insertion part multiple times between the sheet bundle and the staple in a process of removing the staple from the sheet bundle.

According to another aspect of the present invention, there is provided staple removing device configured to remove a staple from a sheet bundle bound by the staple, the staple removing device including:

a support part comprising a placement surface capable of placing the sheet bundle thereon;

an insertion part configured to be insertable between the sheet bundle and the staple in a state in which the sheet bundle is supported on the support part, and configured to remove the staple from the sheet bundle by the insertion; and a controller configured to control an operation of the insertion part, wherein the controller is configured to control the insertion part to intermittently operate the insertion part in a process of inserting the insertion part between the sheet bundle and the staple.

According to the present disclosure, for example, even when the sheet bundle for which removing of a staple is performed is thick, in the process of removing the staple from the sheet bundle, the insertion part is reciprocated multiple times or intermittently operated between the sheet bundle and the staple, thereby removing the staple from the sheet bundle.

DESCRIPTION OF EMBODIMENTS

Hereinafter, favorable embodiments of the present disclosure will be described in detail with reference to the accompanying drawings.

First Embodiment

Configuration Example of Staple Removing Device 1

Figure 1A:
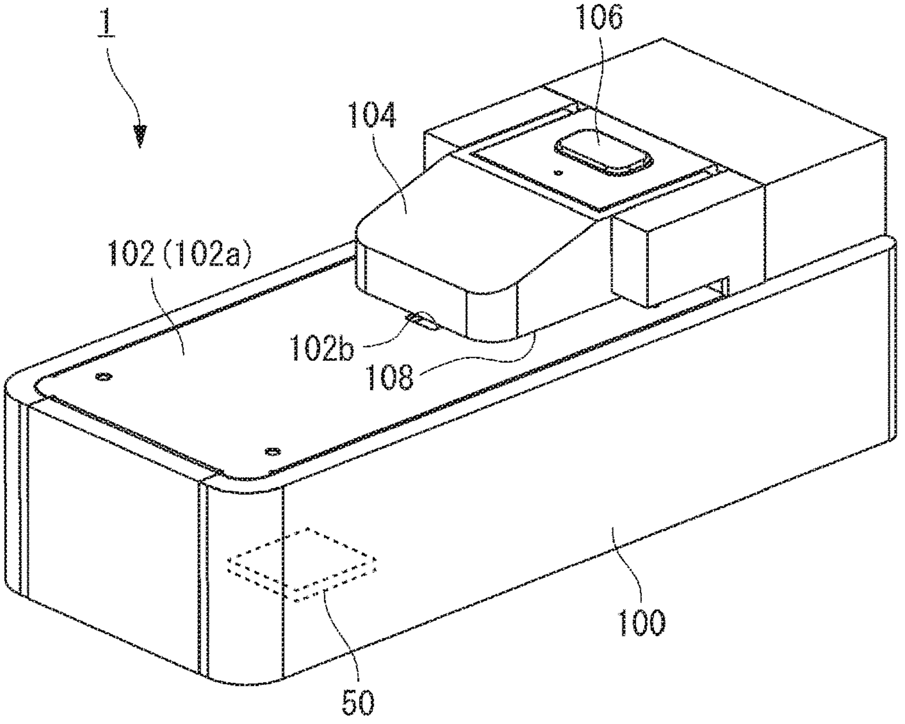
FIG. 1A is a front perspective view of a staple removing device according to a first embodiment.
Figure 1B:
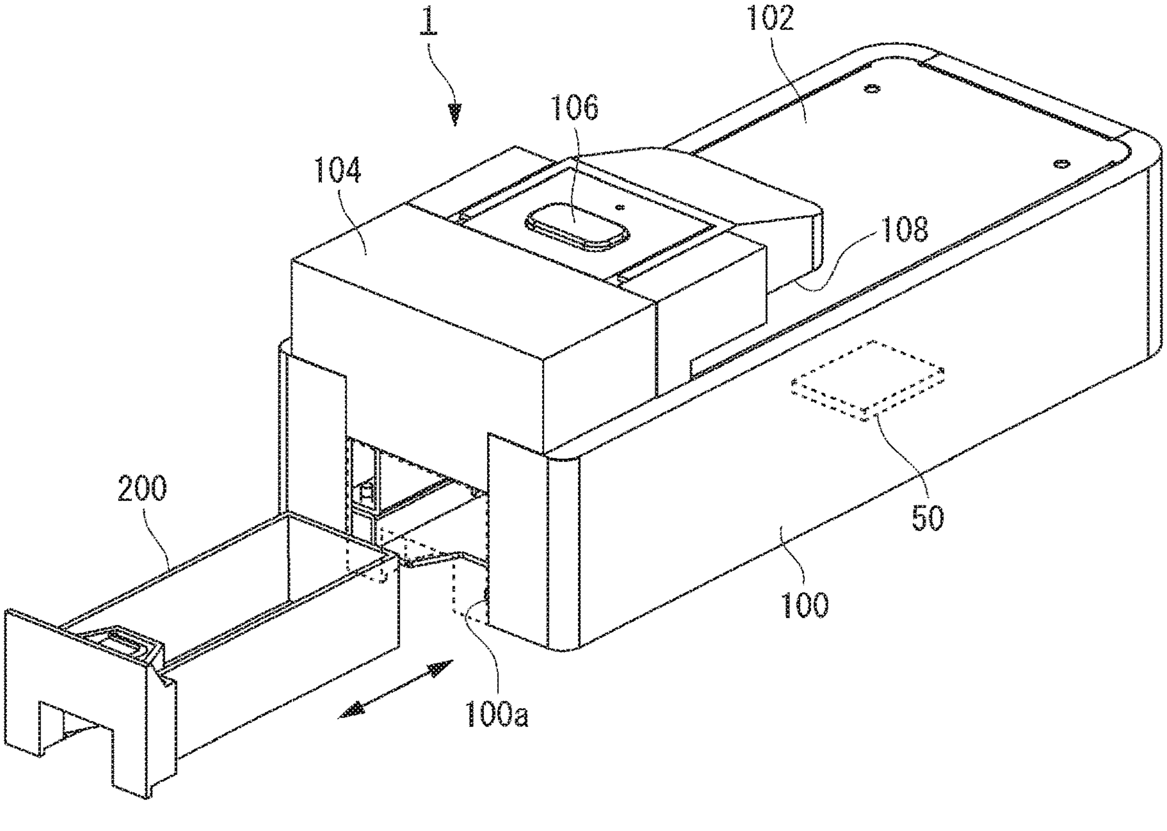
FIG. 1B is a rear perspective view of the staple removing device according to the first embodiment.
Figure 2A:
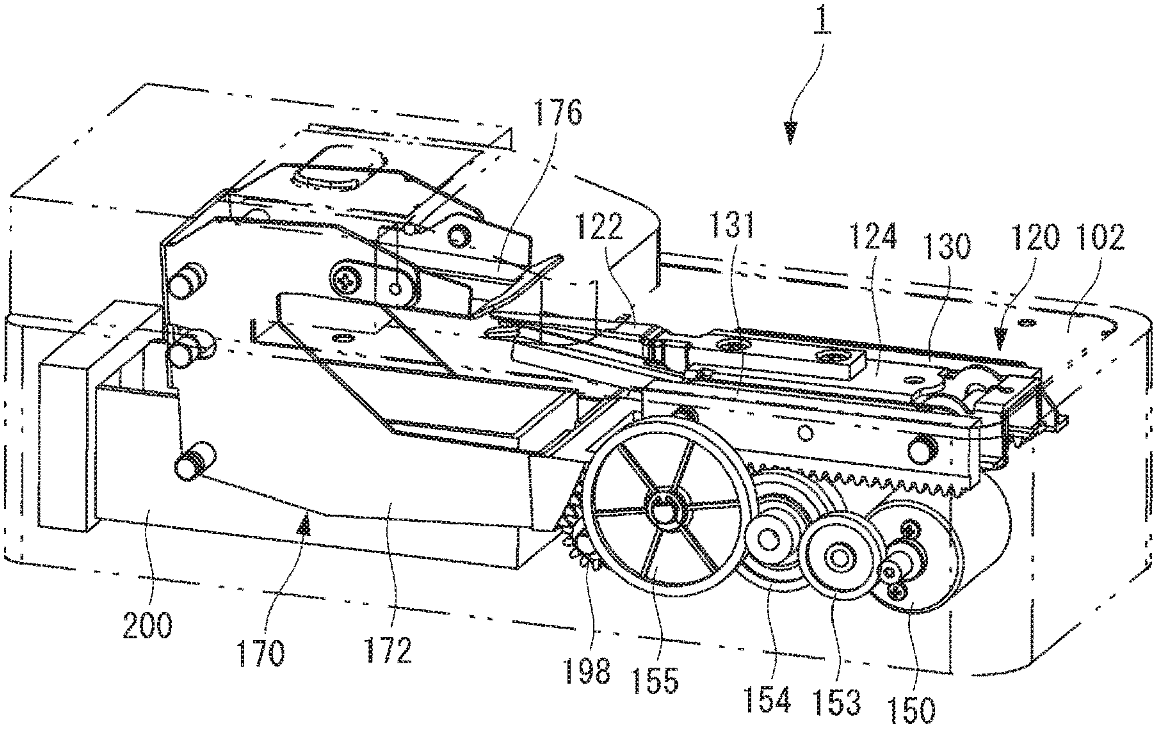
FIG. 2A is a front perspective view of an inside of the staple removing device according to the first embodiment.
Figure 2B:
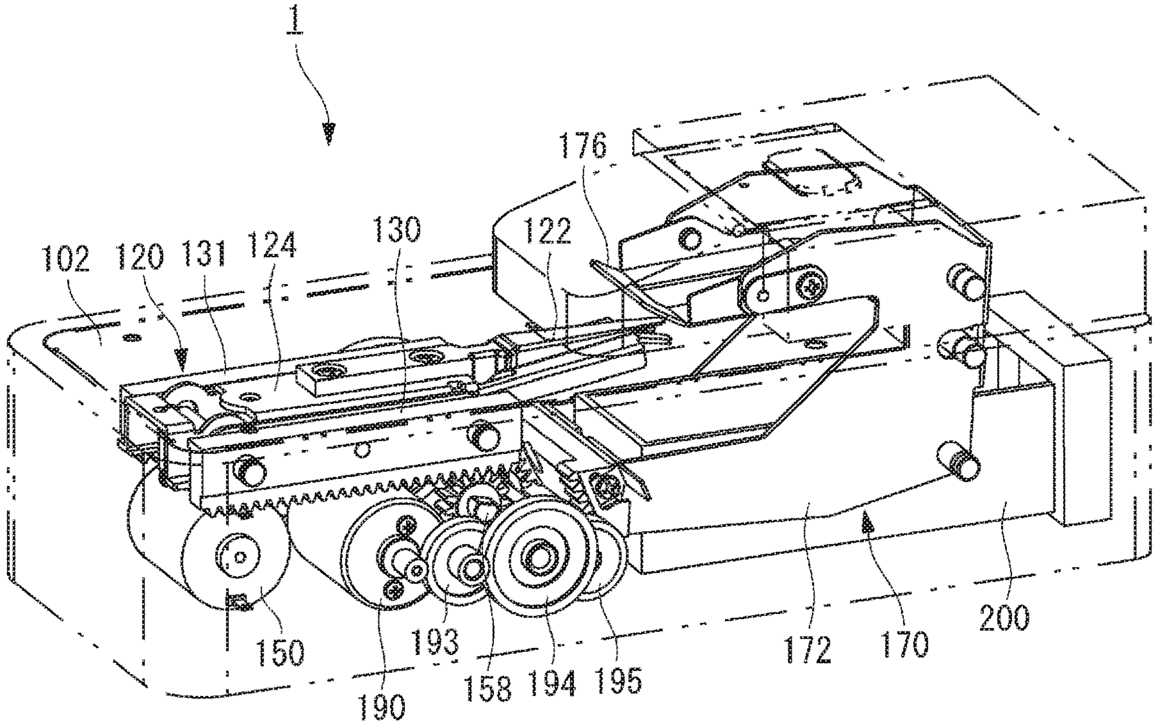
FIG. 2B is a front perspective view of the inside of the staple removing device according to the first embodiment.
Figure 3:
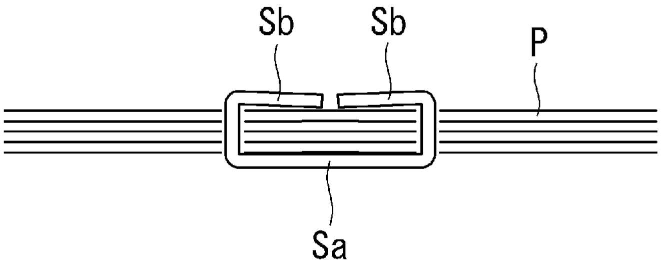
FIG. 3 is a view showing a state of a staple having bound a sheet bundle.
Figure 4A:
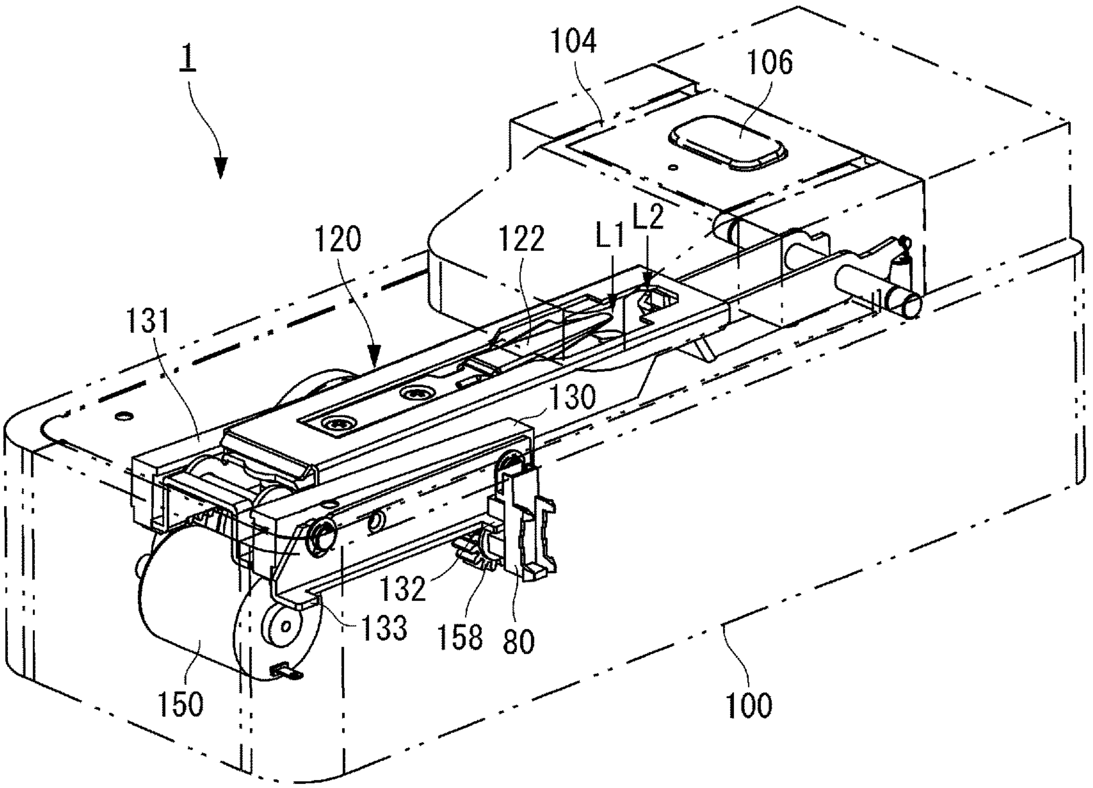
FIG. 4A is a view showing an insertion part standing by at a first position in the staple removing device according to the first embodiment.'
Figure 4B:
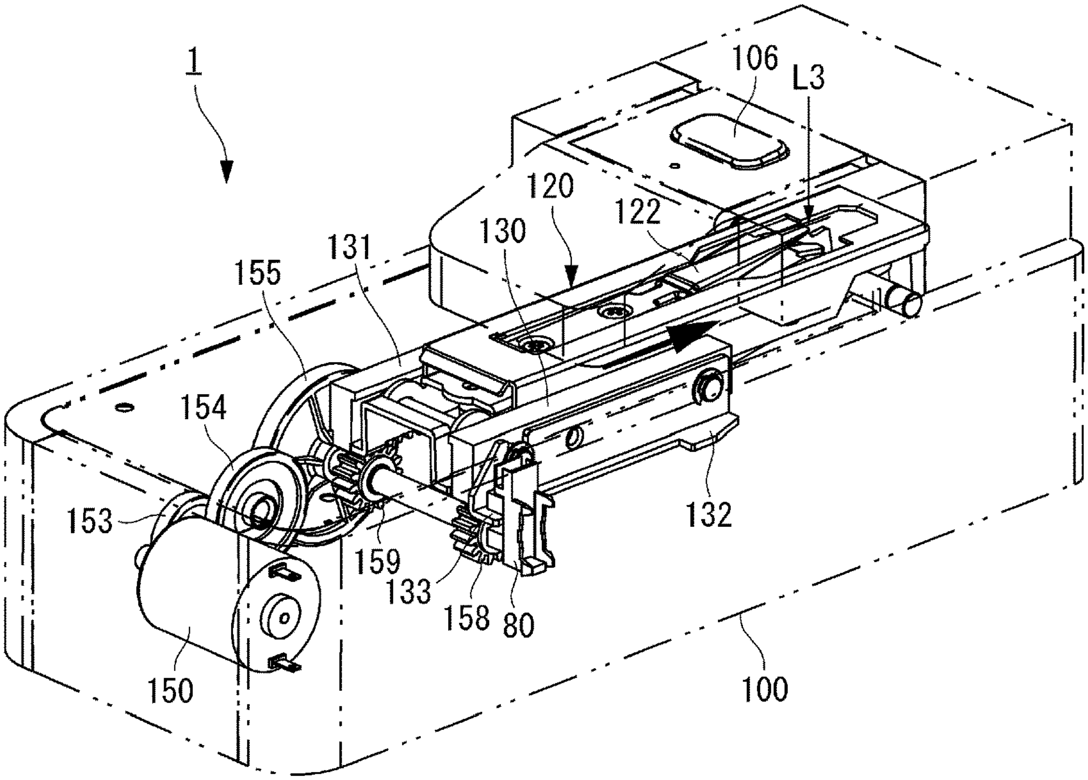
FIG. 4B is a view showing the insertion part moved to a third position in the staple removing device according to the first embodiment.

FIG. 1A is a front perspective view of a staple removing device 1 according to a first embodiment, and FIG. 1B is a rear perspective view. FIGS. 2A and 2B are front perspective views of an inside of the staple removing device 1. FIG. 3 is a view showing a state of a staple S having bound a sheet bundle P. FIG. 4A is a view showing an insertion part 120 standing by at a first position L1 in the staple removing device 1, and FIG. 4B is a view showing the insertion part 120 moved to a third position L3.

The staple removing device 1 according to the present embodiment, is a device for removing a staple S from a sheet bundle P bound by the staple S. As shown in FIGS. 1A and 1B, the staple removing device 1 includes a housing 100 constituted by a substantially cuboid box body. One surface of the housing 100 is constituted as a support part 102 including a placement surface 102*a* for placing the sheet bundle P. In the housing 100, an insertion part 120 for removing the staple S from the sheet bundle P is provided (FIGS. 2A and 2B), and the placement surface 102*a* is formed with an opening 102*b* through which a portion of the insertion part 120 can protrude. When removing the staple S from the sheet bundle P, the insertion part 120 protrudes from the opening 102*b* and is inserted between the sheet bundle P and the staple S. In the housing 100, a controller 50 for controlling an operation of the insertion part 120 is provided.

A cover 104 arranged facing a part of the placement surface 102*a* is provided on one side of the housing 100 in a longitudinal direction. An insertion opening 108 for inserting the sheet bundle P is formed between the cover 104 and the placement surface 102*a*. A start switch 106 for operating the staple removal device 1 is provided on an upper surface of the cover 104.

In the present embodiment, the side of housing 100 in the longitudinal direction, on which the cover 104 is provided, is referred to as a front side of the staple removing device 1 and an opposite side thereto is referred to as a rear side of the staple removing device 1. In addition, a side on which the cover 104 is provided with respect to the housing 100 in a width direction (direction perpendicular to the longitudinal direction) of the housing 100 is referred to as an upper side of the staple removing device 1, and an opposite side thereto is referred to as a lower side of the staple removing device 1.

An attachment/detachment opening 100*a* for attachment/detachment of a dust box 200 with respect to the housing 100 is formed on a rear end face of the housing 100. The dust box 200 is a box body with an open upper surface, and accommodates staples S pulled out and dropped from the sheet bundle P.

As shown in FIG. 3, the staple S has a crown portion Sa and a pair of leg portions Sb and Sb formed by bending both end portions in a longitudinal direction of the crown portion Sa. The sheet bundle P is bound by causing the pair of leg portions Sb and Sb of the staple S to penetrate through a plurality of stacked sheets and bending inwardly the penetrating leg portions Sb and Sb. A binding position of the staple S is, for example, a corner portion or an edge portion of the sheet bundle P. In the present embodiment, the sheet bundle P is placed on the placement surface 102*a* so that the crown portion Sa of the staple S faces the placement surface 102*a* side (lower side).

As shown in FIGS. 2A and 2B, the insertion part 120 has a wedge plate 122, a plate holder 124 for supporting the wedge plate 122, and a pair of racks 130 and 131 attached to the plate holder 124. The wedge plate 122 has a tapered shape and is configured to be insertable between the crown portion Sa of the staple S and the sheet bundle P. A base end portion of the wedge plate 122 is attached to an upper surface of the plate holder 124. The pair of racks 130 and 131 are each arranged on each of left and right side surfaces of the plate holder 124.

A first motor 150 for operating the insertion part 120 is provided in the housing 100. The first motor 150 is arranged at the rear in the housing 100 and below the insertion part 120. The first motor 150 is connected to pinions 158 and 159 via a plurality of gears 153, 154 and 155. In each of the racks 130 and 131, teeth are formed on a lower side of a side surface, and these teeth are adapted to engage with the pinions 158 and 159. Therefore, by driving the first motor 150, the insertion part 120 including the racks 130, 131, the plate holder 124, and the wedge plate 122 is moved via the gears 153, 154 and 155 and the pinions 158 and 159. In the present embodiment, when the first motor 150 drives in forward rotation, the insertion part 120 advances (moves in an insertion direction), and when the first motor 150 drives in reverse rotation, the insertion part 120 retreats (pulled back).

At a position below the cover 104 and facing the placement surface 102*a*, a sheet pressing plate 176 for pressing the placed sheet bundle P is provided. The sheet pressing plate 176 is operated by a second motor 190 in the housing 100. The second motor 190 is arranged in front of the first motor 150 in the housing 100 and below the insertion part 120. The second motor 190 is connected to the sheet pressing plate 176 via gears 193, 194 and 195 and a hold lever 172. The second motor 190 is driven based on an instruction from the controller 50. By driving the second motor 190, the sheet pressing plate 176 operates via the gears 193, 194 and 195 and the hold lever 172. Specifically, the sheet pressing plate 176 moves toward and away from the placement surface 102*a*. In a state where the sheet bundle P is placed on the placement surface 102*a*, when the sheet pressing plate 176 is brought close to the placement surface 102*a*, the sheet bundle P is pressed by the sheet pressing plate 176.

As shown in FIGS. 4A and 4B, a position detector 80 for detecting a position of the insertion part 120 is arranged on a side of the rack 130. A first flag 132 and a second flag 133 are each formed on a side of a front part and on a side of a rear part of the rack 130. The first flag 132 and the second flag 133 are detected by the position detector 80 while the rack 130 (insertion part 120) moves.

Block Diagram of Staple Removing Device

Figure 5:
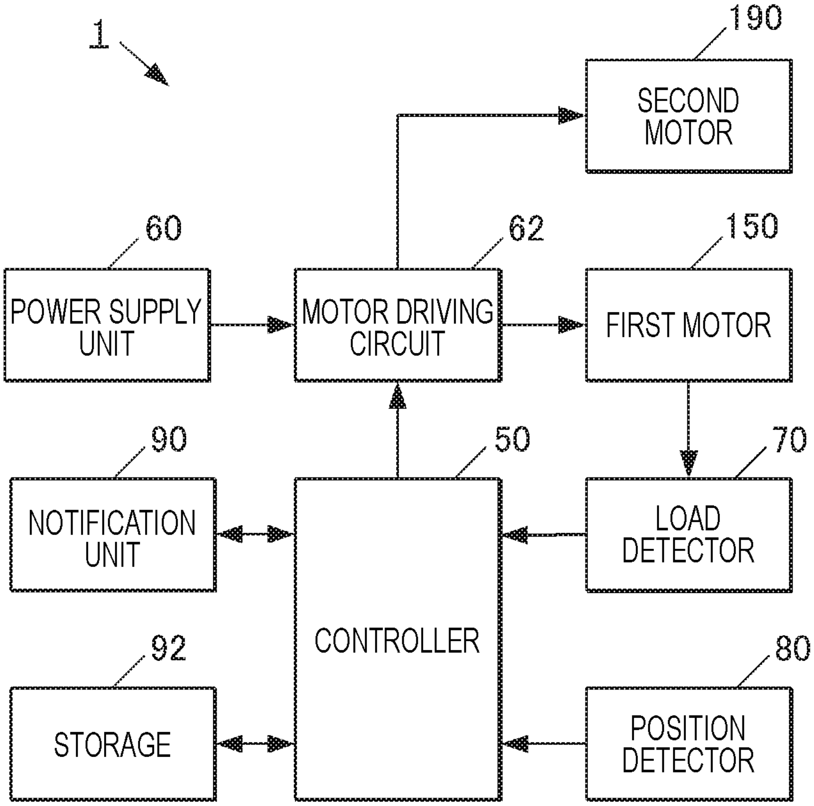
FIG. 5 is a block diagram view of the staple removing device according to the first embodiment.

FIG. 5 is a block diagram of the staple removing device 1. As shown in FIG. 5, the staple removing device 1 includes the controller 50, a power supply unit 60, a motor driving circuit 62, the first motor 150, the second motor 190, a load detector 70, the position detector 80, a notification unit 90 and a storage 92. The controller 50 is connected to each of the motor driving circuit 62, the load detector 70, the position detector 80, the notification unit 90, and the storage 92.

The controller 50 includes a processor such as a central processing unit (CPU) or micro processing unit (MPU), and controls operations of the staple removing device 1.

The power supply unit 60 supplies predetermined power to the motor driving circuit 62. The power supply unit 60 may be an AC power supply, a battery or the like. The motor driving circuit 62 drives each pf the first motor 150 and the second motor 190 by controlling power from the power supply unit 60 based on an instruction from the controller 50.

The load detector 70 detects a motor current that is a motor load flowing through the first motor 150, and outputs the detected motor current to the controller 50. The position detector 80 detects a position of the insertion part 120, and outputs a detection signal to the controller 50. In the present embodiment, the position detector 80 detects the first flag 132 or the second flag 133 of the rack 130.

The notification unit 90 notifies a user when an error (malfunction) occurs in a staple removing operation, for example. As a notification method, any of lighting/blinking of a light emitting unit such as an LED, an error display by a display unit, an audio output from a speaker, and the like may be used.

The storage 92 stores a program for operating the staple removing device 1, various data, and the like. The storage 92 includes, for example, a semiconductor device, a hard disk drive (HDD) or the like.

Operation Example of Insertion Part 120 in Retry Control

FIGS. 6A to 6F are views for illustrating an operation of the insertion part 120 at the time of performing so-called retry control for reciprocating the insertion part 120 (wedge plate 122) multiple times. Note that, in FIGS. 6A to 6F, the insertion part 120, the sheet bundle P, and the staple S are schematically shown for convenience. In the present embodiment, an operation of pulling out the staple S from the sheet bundle P by repeating a reciprocating operation of the insertion part 120 three times will be described.

Figure 6A:
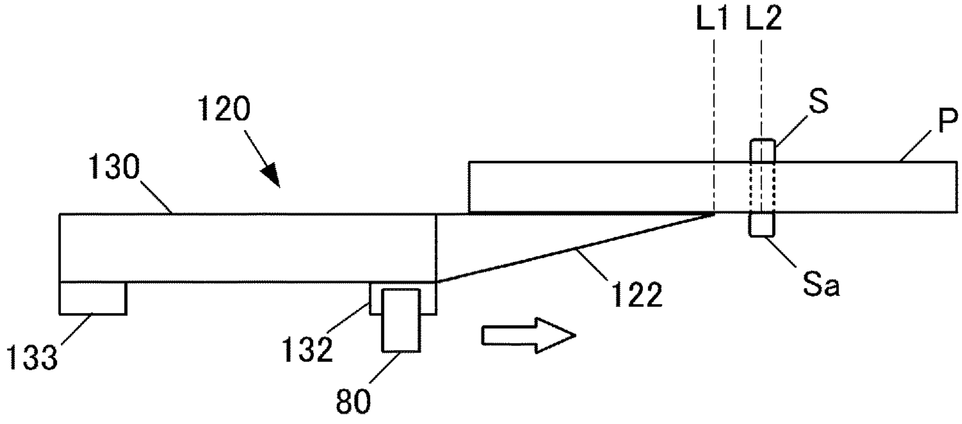
FIG. 6A illustrates a case of performing retry control for reciprocating the insertion part of the staple removing device according to the first embodiment.
Figure 6B:
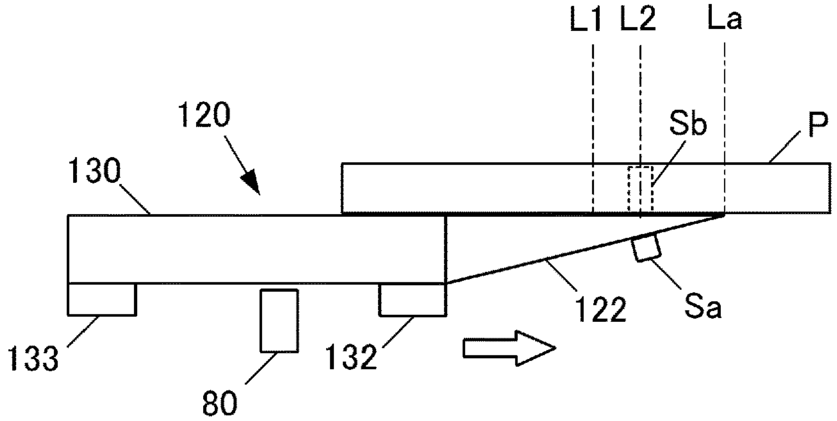
FIG. 6B illustrates the case of performing retry control for reciprocating the insertion part of the staple removing device according to the first embodiment.
Figure 6C:
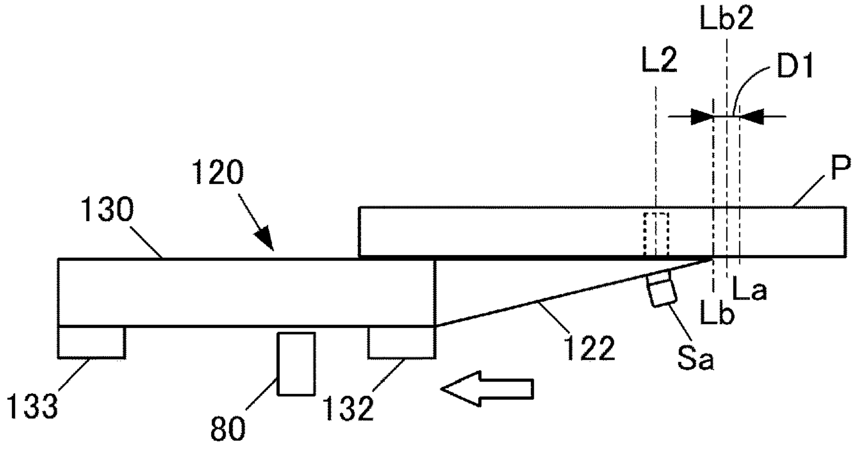
FIG. 6C illustrates the case of performing retry control for reciprocating the insertion part of the staple removing device according to the first embodiment.
Figure 6D:
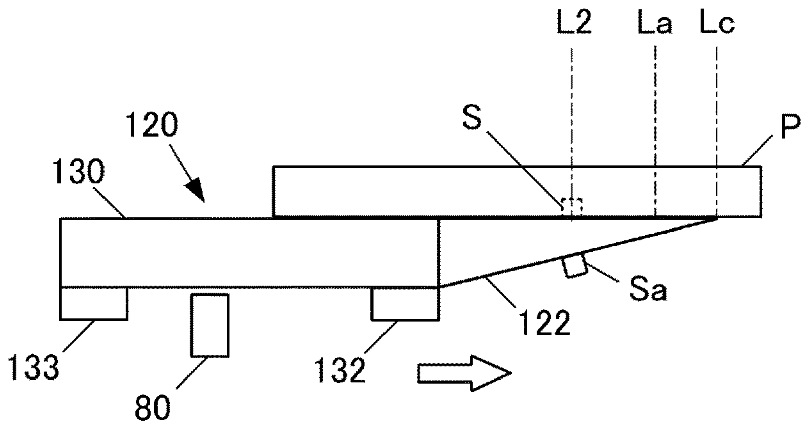
FIG. 6D illustrates the case of performing retry control for reciprocating the insertion part of the staple removing device according to the first embodiment.
Figure 6E:
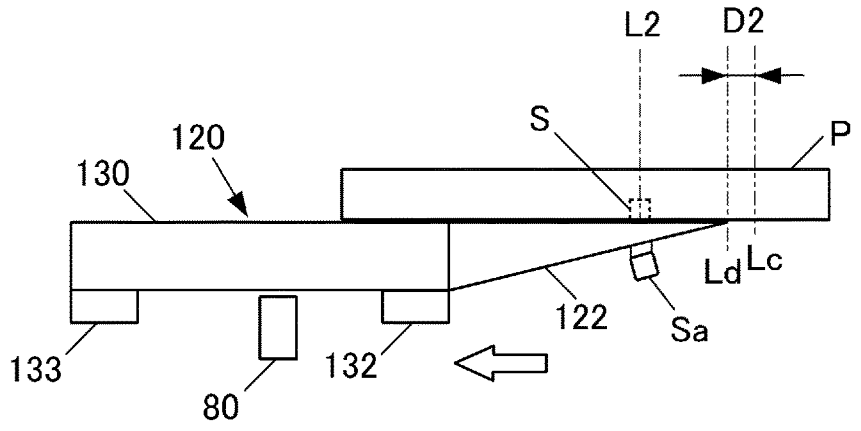
FIG. 6E illustrates the case of performing retry control for reciprocating the insertion part of the staple removing device according to the first embodiment.
Figure 6F:
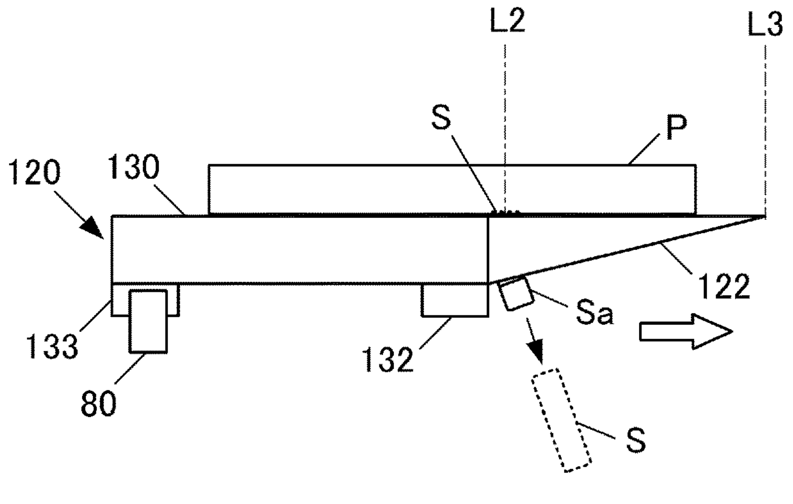
FIG. 6F illustrates the case of performing retry control for reciprocating the insertion part of the staple removing device according to the first embodiment.

As shown in FIGS. 6A and 6F, in the present embodiment, a position where the insertion part 120 stands by before start of a staple removing operation is set as a first position L1, and a position of the insertion part 120 at the time when the staple removing operation is completed is set as a third position L3. In addition, a position between the first position L1 and the third position L3 and at which the staple S to be removed is arranged is set as a second position L2. Note that in the present embodiment, "the position of the insertion part 120" means a position of a tip end of the wedge plate 122.

The first flag 132 is detected by the position detector 80 when the insertion part 120 is at the first position L1, and the second flag 133 is detected by the position detector 80 when the insertion part 120 reaches the third position L3. In the present embodiment, a transmissive sensor is used as the position detector 80. However, the present disclosure is not limited thereto, and a reflective sensor or the like may be used, for example. In the present embodiment, the first flag 132 and the second flag 133 are used as the detected part that is detected by the position detector 80. However, for example, a third flag, a fourth flag or the like may be provided between the first flag 132 and the second flag 133 so that the position of the insertion part 120 can be detected more finely. In addition, the position of the insertion part 120 may be detected by attaching an encoder film to a rotary shaft of the first motor 150 and measuring an amount of rotation of the encoder film.

As shown in FIG. 6A, before the start of the staple removing operation, the insertion part 120 is stopped at the first position L1, and the position detector 80 detects the first flag 132. Then, when the staple removing operation is started, the insertion part 120 advances (moves) from the first position L1 toward the staple S (second position L2) to be removed.

When the insertion part 120 advances and passes the second position L2, the tip end portion of the wedge plate 122 is inserted between the crown portion Sa of the staple S and the sheet bundle P, as shown in FIG. 6B. The wedge plate 122 is formed thicker from the tip end toward the rear. Therefore, when the insertion part 120 further advances, the leg portions Sb of the staple S are pulled out from the normal sheet bundle P (when the sheet bundle P is not thick).

However, when the sheet bundle P is thick (for example, when the sheet bundle P is composed of 40 or more sheets), even if the wedge plate 122 is inserted between the sheet bundle P and the staple S, resistance (hereinafter referred to as pullout resistance) at the time of pulling out the staple S from the sheet bundle P is large, and the wedge plate 122 cannot be moved to a position where the staple S is to be pulled out, so that the staple S may not be pulled out from the sheet bundle P. Specifically, there may be a case where the insertion part 120 stops at a position La in a state in which the leg portions Sb of the staple S is pulled out halfway in a thickness direction of the sheet bundle P, and therefore, the staple S cannot be completely pulled out from the sheet bundle P.

In this way, when the sheet bundle P is thick, there is a case where the staple S cannot be pulled out from the sheet bundle P with a single removing operation. Therefore, in the present embodiment, retry control for reciprocating the wedge plate 122 multiple times between the sheet bundle P and the staple S is performed. Specifically, as shown in FIG. 6C, the operation of the insertion part 120 is controlled so that the tip end of the wedge plate 122 is reciprocated between the positions La and Lb.

The insertion part 120 is controlled so that a central position Lb2 of a variation range (amplitude) of the tip end of the wedge plate 122 at the time of reciprocating between the sheet bundle P and the staple S is located downstream of the position of the staple S in the insertion direction of the wedge plate 122. That is, this control ensures that a pullback position of the wedge plate 122 at the time of reciprocating the wedge plate 122 is not located considerably upstream of the second position L2 where the staple S is located (the wedge plate is not excessively pulled back). When reciprocating the wedge plate 122, if the tip end of the wedge plate 122 is pulled back significantly upstream of the staple S (crown portion Sa), the sheet bundle P is also dragged at the same time upon retreat of the insertion part 120, making it easier to move. If the wedge plate 122 is advanced again in a state where the sheet bundle P has moved, the tip end of the wedge plate 122 may be caught (collides) with the leg portions Sb of the staple S, making it impossible to insert the wedge plate 122 between the crown portion Sa and the sheet bundle P. However, in the process of reciprocating the wedge plate 122, the pullback position of the wedge plate 122 is controlled as described above, so that it is possible to suppress the problem that the sheet bundle P is dragged and moved.

For the above reasons, in the present embodiment, as a more preferable control means, when reciprocating the wedge plate 122, the tip end of the wedge plate 122 is controlled so as not to come out from between the crown portion Sa and the sheet bundle P. When pulling back the wedge plate 122, the tip end of the wedge plate 122 is controlled not to come out from between the crown portion Sa and the sheet bundle P, specifically, the wedge plate 122 is controlled not to retreat to an upstream side of the second position L2. Thereby, when the insertion part 120 retreats, it becomes more difficult for the sheet bundle P to be dragged, and when the wedge plate re-advances, it is possible to avoid more reliably the problem in that the tip end of the wedge plate 122 is caught (collide) with the leg portions Sb of the staple S and the wedge plate 122 cannot be thus inserted between the crown portion Sa and the sheet bundle P.

When the insertion part 120 is retreated (pulled back) by a predetermined distance D1, the insertion part 120 is again advanced (moved in the insertion direction) (second insertion), as shown in FIG. 6D. Since the staple is pulled out halfway by the first insertion, the insertion part 120 further advances than the previous position La when advancing again. However, even at this stage, since the pullout resistance of the sheet bundle P is large, the wedge plate 122 stops at a position Lc. At this time, the leg portions Sb of the staple S are further pulled out from the sheet bundle P as the insertion part 120 is advanced, but parts of the leg portions Sb of the staple S remain in the sheet bundle P without being pulled out.

Therefore, as shown in FIG. 6E, the insertion part 120 is further pulled back to a position Ld (moved in an L1 direction by a distance D2). As described above, the position Ld is a position where the tip end of the wedge plate 122 does not come out from between the crown portion Sa and the sheet bundle P.

When the insertion part 120 is retreated in the L1 direction by the distance D2, the insertion part 120 is advanced (inserted) again (third insertion), as shown in FIG. 6F. Due to the third insertion of the wedge plate 122, the pullout resistance of the staple S is also reduced, so the tip end portion of the wedge plate 122 advances to the third position L3. Thereby, the wedge plate 122 is inserted between the sheet bundle P and the staple S up to the maximum thickness thereof, and the staple S is completely pulled out from the sheet bundle P by the wedge plate 122.

Note that in the example of FIGS. 6A to 6F, the wedge plate 122 is reciprocated three times to remove the staple S from the sheet bundle P. However, depending on the thickness of the sheet bundle P, the staple S may be removed by two reciprocations, or may not be removed without four or more reciprocations.

Figure 7:
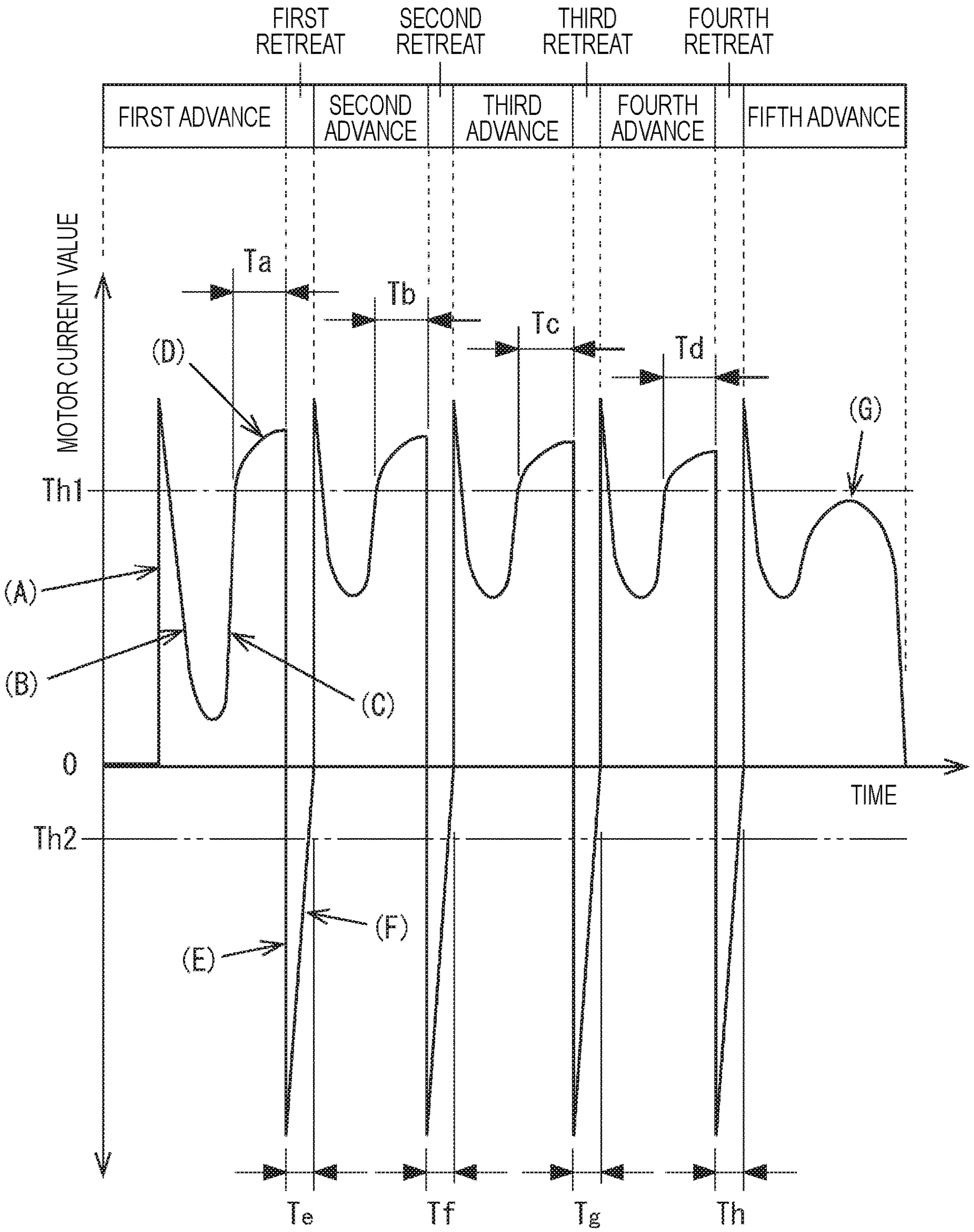
FIG. 7 is a graph showing a relationship between a motor current value of a first motor and a time when the retry control is performed multiple times in a staple removing operation of the staple removing device according to the first embodiment.

Variation Example of Current Value of First Motor 150 when Performing Try Control FIG. 7 is a graph showing a relationship between a current value of the first motor 150 and a time when a reciprocating operation is performed multiple times, in this example, five times (an initial operation and four additional retry controls) in the staple removing operation. Note that, in FIG. 7, a first threshold value Th1 is a threshold value that is used at the time of switching the advancing of the insertion part 120 to the retreat when a high load is applied to the first motor 150 for a predetermined time.

As shown in FIG. 7, along with the start of the staple removing operation, the first motor 150 is driven in forward rotation, and the first movement (insertion) of the insertion part 120 is performed. At the start of the first motor 150, as shown in (A), the motor current value rises. Thereafter, until the wedge plate 122 is inserted between the sheet bundle P and the staple S, as shown in (B), the motor current value temporarily decreases and the load decreases.

When the wedge plate 122 is inserted between the sheet bundle P and the staple S, the load increases due to the pullout resistance or the like described above, and the motor current value rapidly rises as shown in (C). When the sheet bundle P is thick, the pullout resistance is large, as compared with the usual thickness of the sheet bundle P, so the advancing of the insertion part 120 stops, and as shown in (D), a state where the motor current value exceeds the first threshold value Th1 continues for a predetermined time.

In the present embodiment, as shown in (D), when the state in which the motor current value exceeds the first threshold value Th1 continues for a predetermined time Ta or longer, retry control for switching the advancing of the insertion part 120 to the retreat is performed. That is, when the state in which the motor current value exceeds the first threshold value Th1 continues for the predetermined time Ta or longer, the first motor 150 is driven in reverse rotation, and the first retreat (pullback) of the insertion part 120 is performed. When driving the first motor 150 in reverse rotation, the motor current value rises to the negative side, as shown in (E), due to the starting current at the start of driving and the pullout resistance of the staple S.

Thereafter, when the wedge plate 122 comes out from between the sheet bundle P and the staple S and retreats, the load decreases, and the motor current value drops (approaches zero), as shown in (F). The pullback amount (distance) by which the insertion part 120 is retreated is determined by an operating time of the first motor 150. In the present embodiment, by driving the first motor 150 for an operating time Te, the insertion part 120 is stopped at a position where the tip end of the wedge plate 122 does not come out from between the sheet bundle P and the staple S (refer to FIG. 6C).

Thereafter, by performing the retry control 2 to 4 times, the motor current value exhibits a similar change. In the present embodiment, during second retry control, when the state in which the motor current value is equal to or greater than the first threshold value Th1 continues for a predetermined time Tb, the first motor 150 is driven in reverse rotation for an operating time Tf, so that second retreat of the insertion part 120 is performed. During third retry control, when the state in which the motor current value is equal to or greater than the first threshold value Th1 continues for a predetermined time Tc, the first motor 150 is driven in reverse rotation for an operating time Tg, so that third retreat of the insertion part 120 is performed. During fourth retry control, when the state in which the motor current value is equal to or greater than the first threshold value Th1 continues for a predetermined time Td, the first motor 150 is driven in reverse rotation for an operating time Th, so that fourth retreat of the insertion part 120 is performed. During fifth retry control, the leg portions Sb of the staple S is in a state where it is easy to come out from the sheet bundle P by the retry control up to the previous time, and the pullout resistance is also small. For this reason, as shown in (G), by the advancing of the insertion part 120, after insertion of the wedge plate 122, the motor current value transitions to a value less than the first threshold value Th1. Thereby, the staple S is pulled out from the sheet bundle P, and then the first motor 150 is stopped.

Note that, in the drawing, the predetermined times Ta, Tb, Tc and Td are set to the same time for convenience, and the operating times Te, Tf, Tg and Th are set to the same time for convenience, but different times may be used. In the present embodiment, the predetermined times Ta, Tb, Tc and Td, and the operating times Te, Tf, Tg and Th are set to 20 to 50 msec, and the first threshold value Th1 is set to 1.6 A with respect to the rated value of 2.5 A. However, these values can be arbitrarily set in consideration of user's operability, a power supply capacity of the device, and the like, and are not limited to these ranges.

Figure 8:
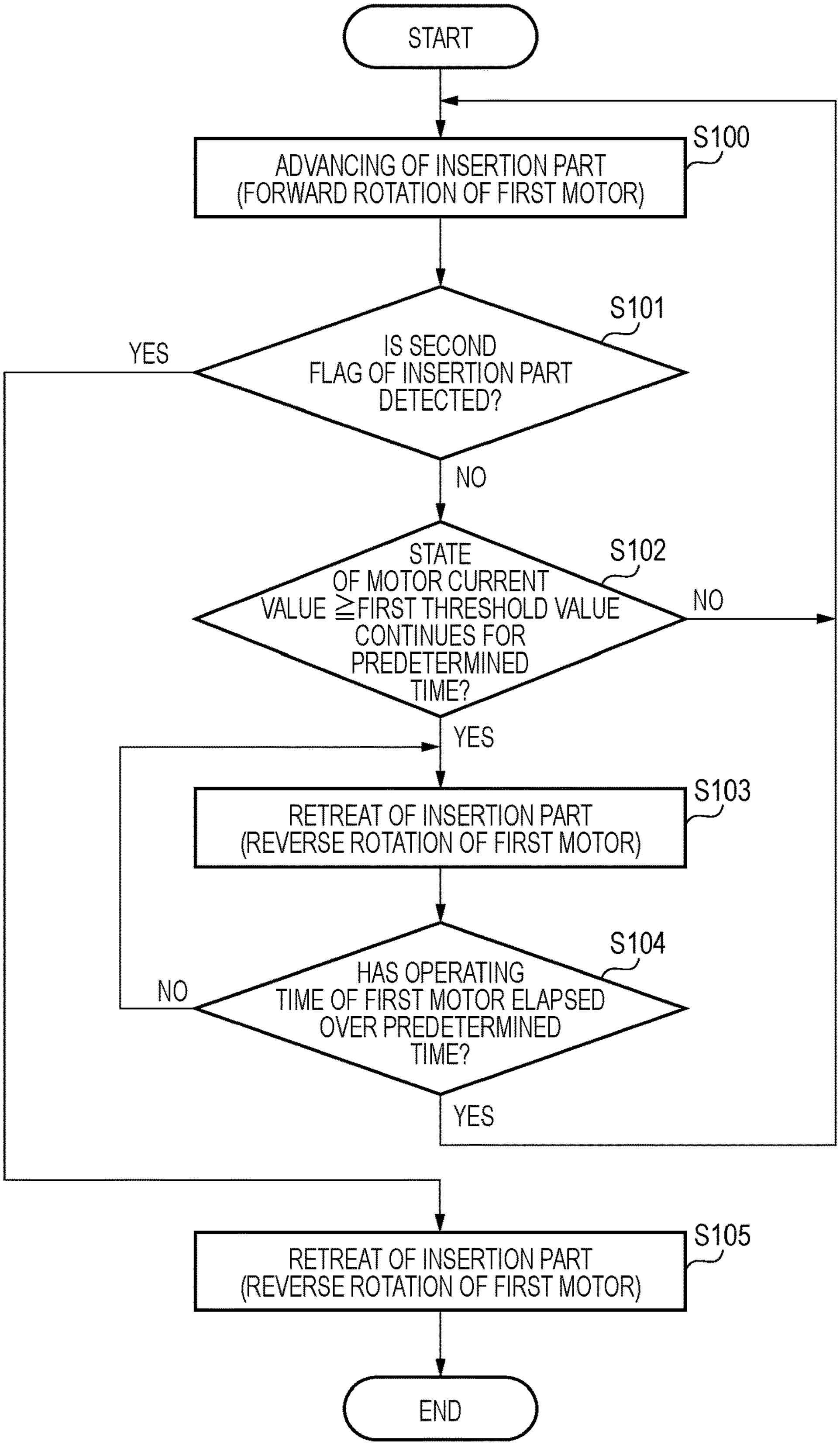
FIG. 8 is a flowchart showing processing of a controller when performing a staple removing operation according to the first embodiment.

Operation Example of Staple Removing Device 1 During Staple Removing Operation FIG. 8 is a flowchart showing processing of the controller 50 when performing a staple removing operation.

In S100, upon detecting that a start switch 106 has been operated, the controller 50 drives the first motor 150 in forward rotation. Thereby, the insertion part 120 advances (moves in the insertion direction).

In S101, the controller 50 determines whether the second flag 133 has been detected by the position detector 80 along with the advancing of the insertion part 120. This processing corresponds to determining whether the insertion part 120 has moved to the third position L3 where the pullout of the staple S from the sheet bundle P is completed.

When it is determined that the second flag 133 has been detected by the position detector 80, i.e., when it is determined that the insertion part 120 has moved to the third position L3 and the staple S has been normally pulled out from the sheet bundle P, the controller 50 proceeds to S105, and drives the first motor 150 in reverse rotation to retreat the insertion part 120 from the third position L3 to the first position L1. Thereby, the insertion part 120 returns to the standby position, and a series of staple removing operations ends.

On the other hand, when it is determined that the second flag 133 has not been detected by the position detector 80, i.e., when it is determined that the insertion part 120 has not moved to the third position L3 where the pullout of the staple S from the sheet bundle P is completed, the controller 50 proceeds to S102.

In S102, the controller 50 determines whether the motor current value, which is a motor load, is in a state of being equal to or greater than the first threshold value Th1, and the state continues for a predetermined time. When it is determined that the state where the motor current value is equal to or greater than the first threshold value Th1 does not continue for a predetermined time, the controller 50 returns to S100 and continues to advance the insertion part 120.

On the other hand, when it is determined that the motor current value is equal to or greater than the first threshold value Th1 and the state continues for a predetermined time, the controller 50 proceeds to S103. The case where the motor current value is equal to or greater than the first threshold value Th1 and the state continues for a predetermined time is a case where the advancing of the insertion part 120 stops in the process of the pullout of the staple S due to the thick sheet bundle P or the like.

In S103, the controller 50 drives the first motor 150 in reverse rotation to retreat the insertion part 120.

In S104, the controller 50 determines whether the operating time of the first motor 150 has elapsed over a predetermined time set in advance. Here, the predetermined time means a time for stopping the tip end portion of the wedge plate 122 under retreat at a position where it does not come out from between the staple S and the sheet bundle P (refer to FIG. 7). The predetermined time may be set based on, for example, a rotating speed of the first motor 150, an amount (moving distance) of pulling back the wedge plate 122 and the like.

When it is determined that the operating time of the first motor 150 has not elapsed over the predetermined time set in advance, the controller 50 returns to S103 and continues to retreat the insertion part 120.

On the other hand, when it is determined that the operating time of the first motor 150 has elapsed over the predetermined time set in advance, the controller 50 returns to S100. In this case, by switching the first motor 150 to forward rotation to advance the insertion part 120, the wedge plate 122 is again inserted between the sheet bundle P and the staple S. In this way, in the present embodiment, the retry control for reciprocating the insertion part 120 multiple times is performed in accordance with the thickness of the sheet bundle P or the like.

Note that, in the embodiment described above, the amount of pulling back the insertion part 120 when reciprocating the insertion part 120 during the retry control is determined based on the operating time of the first motor 150. However, the present disclosure is not limited thereto. For example, the amount of pulling back the insertion part 120 when reciprocating the insertion part 120 may be determined based on the motor current value that is a load of the first motor 150. Specifically, when the advancing of the insertion part 120 is stopped due to the thickness of the sheet bundle P or the like, the retry control for reciprocating the insertion part 120 is performed. In this case, however, a timing for ending the pullback operation of the insertion part 120 is determined based on the motor current value. As shown in FIG. 7, the controller 50 stops the reverse rotation drive of the first motor 150 and ends the pullback operation of the insertion part 120 when the motor current value becomes equal to or less than a preset second threshold value Th2 after starting the pullback of the insertion part 120.

In addition, the amount of pulling back the insertion part 120 when reciprocating the insertion part 120 may be determined based on an amount of rotation of the first motor 150. Specifically, when the amount of pulling back the insertion part 120, the rotating speed of the first motor 150 and the like are set in advance, the amount of rotation of the first motor 150 may be set based on these pieces of information. The controller 50 stops the reverse rotation drive of the first motor 150 and ends the pullback operation of the insertion part 120 when the set amount of rotation is reached after the first motor 150 is started. Alternatively, an amount of movement of the insertion part 120 (wedge plate 122) may be detected, and the amount of pulling back the insertion part 120 may be determined based on the amount of movement.

Further, the timing at which the advancing of the insertion part 120 is switched to movement in the pullback direction during the retry control is determined based on the motor current value, but may be determined based on the operating time of the first motor 150. Specifically, when the advancing of the insertion part 120 is stopped due to the thickness of the sheet bundle P or the like, the operating time of the first motor 150 also becomes longer. Therefore, at a timing when the preset operating time of the first motor 150 has elapsed, the retry control is performed by switching the first motor 150 to reverse rotation drive.

Note that the following processing may be inserted into the processing (S100 to S105) of the controller 50 described above. That is, a time from when the insertion part 120 starts to advance may be measured, and when the operation of removing the staple S is not completed even after the elapse of the predetermined time, the first motor 150 may be driven in reverse rotation to return the insertion part 120 to the standby position (first position L1), and an error may be displayed to an operator (notification by the notification unit 90).

In addition, for example, it may be determined whether the number of times of retry (reciprocation) exceeds a predetermined number of times set in advance, and when it is determined that the number of times of retry exceeds the predetermined number of times, the retry control may be forcibly ended regardless of whether the staple S has been pulled out from the sheet bundle P. This is because there is a case in which the staple S is not pulled out from the sheet bundle P even if the wedge plate 122 is inserted multiple times when the sheet bundle P is thicker than expected, for example. Note that when ending the retry control, an error may be displayed to an operator (notification by the notification unit 90).

As described above, according to the present embodiment, the retry control for reciprocating the insertion part 120 multiple times between the sheet bundle P and the staple S is performed, so that it is possible to pull out the staple S from the thick sheet bundle P without enlarging the drive mechanism such as the first motor 150 and the gear 153.

In addition, in the present embodiment, when the motor current value is equal to or greater than the first threshold value Th1, i.e., when the sheet bundle P is thick, the retry control is performed, and when the motor current value is less than the first threshold value Th1, i.e., when the sheet bundle P has a thin normal thickness, the retry control is not performed. Therefore, when the sheet bundle P is thin or of normal thickness, the staple removing operation can be performed in a short operation time, and even when there are various types of sheet bundles P, the retry control is performed only when the pullout resistance is high, so that it is possible to reduce the operation time.

Second Embodiment

In the first embodiment, the staple S is removed from the sheet bundle P by reciprocating the wedge plate 122 between the sheet bundle P and the staple S. However, a second embodiment is different from the first embodiment, in that the wedge plate 122 is not reciprocated but intermittently advanced (not retreated (not pulled back)). Note that in the present embodiment, components having substantially the same functional configuration as those of the staple removing device 1 of the first embodiment are denoted with the same reference numerals, and the overlapping descriptions are omitted.

Figure 9:
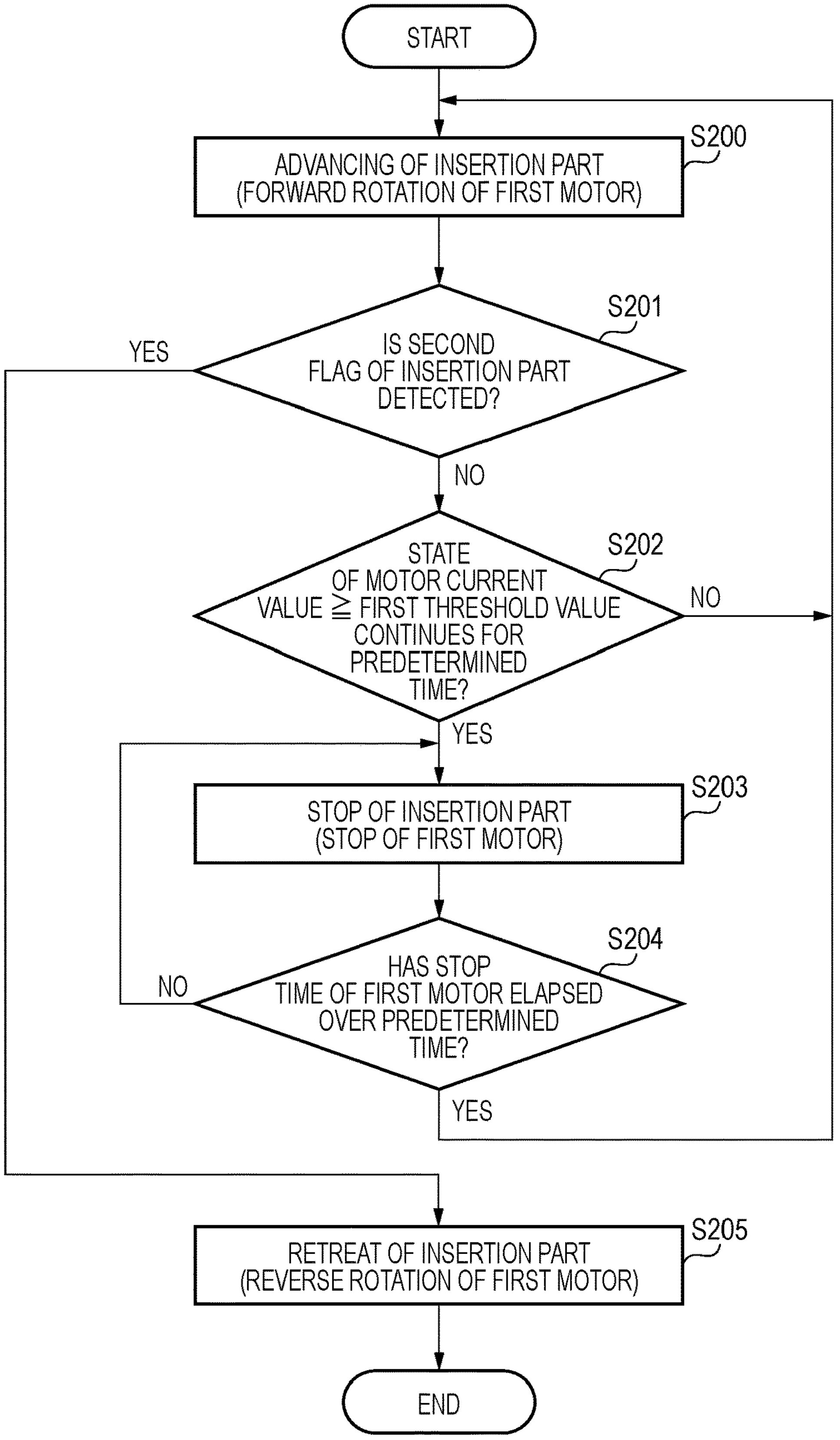
FIG. 9 is a flowchart showing processing of the controller when performing the staple removing operation according to a second embodiment.

FIG. 9 is a flowchart showing processing of the controller 50 when performing the staple removing operation according to the second embodiment.

In S200, the controller 50 drives the first motor 150 in forward rotation when the start switch 106 is operated. Thereby, the insertion part 120 advances (moves in the insertion direction). In S201, the controller 50 determines whether the second flag 133 has been detected by the position detector 80 along with the advancing of the insertion part 120.

When it is determined that the second flag 133 has been detected by the position detector 80, the controller 50 proceeds to S205 assuming that the staple S has been pulled out from the sheet bundle P. In S205, the controller 50 drives the first motor 150 in reverse rotation to move the insertion part 120 in the pullback direction and to return the same to the first position L1. Thereby, the insertion part 120 returns to the standby position, and a series of staple removing operations ends.

On the other hand, when it is determined that the second flag 133 has not been detected by the position detector 80, the controller 50 proceeds to S202.

In S202, the controller 50 determines whether the motor current value, which is a motor load, is equal to or greater than the first threshold value Th1 and the state continues for a predetermined time. When the state where the motor current value exceeds the first threshold value Th1 does not continue for a predetermined time, the controller 50 returns to S200 and continues to advance the insertion part 120.

On the other hand, when the motor current value is equal to or greater than the first threshold value Th1 and the state continues for a predetermined time, the controller 50 proceeds to S203.

In S203, the controller 50 stops the moving operation of the insertion part 120 in the insertion direction by stopping the first motor 150. In this case, the insertion part 120 stops in a state of being inserted between the sheet bundle P and the staple S.

In S204, the controller 50 determines whether the stop time of the first motor 150 has elapsed over a predetermined time set in advance. Here, the predetermined time may be an arbitrary value set by the user, or an optimal value set in advance in consideration of the entire operation time of the staple removing operation. When it is determined that the stop time of the first motor 150 has not elapsed over the predetermined time set in advance, the controller 50 returns to S203 and continues to stop the insertion part 120.

On the other hand, when it is determined that the stop time of the first motor 150 has elapsed over the predetermined time set in advance, the controller 50 returns to S200 and drives the first motor 150 in forward rotation to advance the insertion part 120. As described above, in the present embodiment, the controller 50 controls the first motor 150 to repeat the movement of the insertion part 120 in the insertion direction and the stop thereof in the process of inserting the insertion part 120 between the sheet bundle P and the staple S (to intermittently move the wedge plate 122 without pulling back the wedge plate).

According to the present embodiment, the control for stopping the insertion part 120 and then advancing the insertion part again in the insertion direction, i.e., the control for advancing the insertion part 120 intermittently without pulling back the insertion part is performed so that the load for pulling out the staple S from the sheet bundle P (load for moving the insertion part 120 in the insertion direction) is gradually reduced and the staple S is finally pulled out from the sheet bundle P. In this way, by intermittently advancing the wedge plate 122 between the sheet bundle P and the staple S, the staple S that could not be pulled out with a single advancing operation (continuous operation) of the wedge board 122 can be pulled out from the sheet bundle P.

In the first embodiment, the position at which the insertion part 120 is pulled back during the retry control is set to the position where the tip end portion of the wedge plate 122 does not come out from between the crown portion Sa and the sheet bundle P. However, the pullback position may be set to a position on a further upstream side than the second position L2 between the crown portion Sa and the sheet bundle P as long as the position is within a range in which a center position of the variation range of the insertion part 120 at the time when the insertion part 120 reciprocates between the sheet bundle P and the staple S is located downstream of the position of the staple S (second position L2) in the insertion direction of the insertion part 120. Even when the pullback position of the insertion part 120 is located upstream of the position of the crown portion Sa, unless the position is located considerably upstream of the crown portion Sa, the sheet bundle P is hardly dragged and moved at the time of pulling back the insertion part 120. In addition, when re-inserting the insertion part 120, the tip end of the wedge plate 122 is not caught with the staple S.

Although the favorable embodiments of the present disclosure have been described in detail with reference to the accompanying drawings, the technical scope of the present disclosure is not limited thereto. A variety of changes or modifications can be conceived within the technical spirit defined in the claims by one skilled in the art of the present disclosure, and are naturally understood to be included within the technical scope of the present disclosure.

What is claimed is:

1. A staple removing device configured to remove a staple from a sheet bundle bound by the staple, the staple removing device comprising:
- a support part comprising a placement surface capable of placing the sheet bundle thereon;
- an insertion part configured to be insertable between the sheet bundle and the staple in a state in which the sheet bundle is supported on the support part, and configured to remove the staple from the sheet bundle by the insertion; and
- a controller configured to control an operation of the insertion part,
- wherein the controller is configured to reciprocally move the insertion part multiple times between the sheet bundle and the staple in a process of removing the staple from the sheet bundle.

2. The staple removing device according to claim 1, wherein the controller is configured to control the operation of the insertion part so that a center position of a variation range of the insertion part at a time when the insertion part reciprocally moves between the sheet bundle and the staple is located downstream of a position of the staple in an insertion direction of the insertion part.

3. The staple removing device according to claim 2, wherein the controller is configured to control the operation of the insertion part to pull back the insertion part to a position where the insertion part does not come out from the staple when reciprocating the insertion part.

4. The staple removing device according to claim 2, further comprising a motor configured to operate the insertion part,
- wherein the controller is configured to control the operation of the insertion part via the motor, and to switch an operation of the insertion part from an insertion operation to a pullback operation based on a load of the motor.

5. The staple removing device according to claim 4, wherein the controller is configured to switch the operation of the insertion part from the insertion operation to the pullback operation when the load of the motor is equal to or greater than a first threshold value.

6. The staple removing device according to claim 5, wherein the controller is configured to switch the insertion part from the insertion operation to the pullback operation when a load of the motor equal to or greater than the first threshold value continues for a predetermined time.

7. The staple removing device according to claim 2, further comprising a motor configured to operate the insertion part,
- wherein the controller is configured to control the operation of the insertion part via the motor, and to determine an amount of pulling back the insertion part when reciprocating the insertion part, based on an operating time of the motor.

8. The staple removing device according to claim 2, further comprising a motor configured to operate the insertion part,
- wherein the controller is configured to control the operation of the insertion part via the motor, and to determine an amount of pulling back the insertion part when reciprocating the insertion part, based on an amount of rotation of the motor.

9. The staple removing device according to claim 2, further comprising a motor configured to operate the insertion part,
- wherein the controller is configured to control the operation of the insertion part via the motor, and to determine an amount of pulling back the insertion part when reciprocating the insertion part, based on a load of the motor.

10. The staple removing device according to claim 9, wherein the controller is configured to end a pullback operation of the insertion part when the load of the motor becomes equal to or less than a second threshold value after starting the pullback operation of the insertion part.

11. A staple removing device configured to remove a staple from a sheet bundle bound by the staple, the staple removing device comprising: a support part comprising a placement surface capable of placing the sheet bundle thereon; an insertion part configured to be insertable between the sheet bundle and the staple in a state in which the sheet bundle is supported on the support part, and configured to remove the staple from the sheet bundle by the insertion; and a controller configured to control an operation of the insertion part, wherein the controller is configured to control the insertion part to intermittently operate and repeat insertion and stop of the insertion part in a process of inserting the insertion part between the sheet bundle and the staple.

* * * * *